United States Patent [19]
Saito

[11] Patent Number: 5,297,038
[45] Date of Patent: Mar. 22, 1994

[54] ELECTRONIC DICTIONARY AND METHOD OF CODIFYING WORDS THEREFOR

[75] Inventor: Keizou Saito, Nara, Japan

[73] Assignee: Sharp Kabushiki Kaisha, Osaka, Japan

[21] Appl. No.: 646,358

[22] Filed: Jan. 25, 1991

Related U.S. Application Data

[63] Continuation-in-part of Ser. No. 463,813, Jan. 16, 1990, abandoned, which is a continuation of Ser. No. 289,485, Dec. 21, 1988, abandoned, which is a continuation of Ser. No. 186,721, Apr. 22, 1988, abandoned, which is a continuation of Ser. No. 912,530, Sep. 26, 1986, abandoned.

[30] Foreign Application Priority Data

Sep. 27, 1985 [JP] Japan .................................. 60-215691
Jan. 16, 1986 [JP] Japan .................................... 61-7712
Jan. 27, 1986 [JP] Japan .................................. 61-15342

[51] Int. Cl.$^5$ .............................................. G06F 15/40
[52] U.S. Cl. ................................................ 364/419.11
[58] Field of Search ........................... 364/419; 400/63

[56] References Cited

U.S. PATENT DOCUMENTS 4,498,148 2/1985 Glickman ............................. 364/419
4,959,785 9/1990 Yamamoto et al. ................ 364/419

Primary Examiner—Roy N. Envall, Jr.
Assistant Examiner—Xuong Chung
Attorney, Agent, or Firm—Morrison & Foerster

[57] ABSTRACT

Even-letter and odd-letter words are separately stored in an electronic dictionary and are codified by using predefined letter weight numbers and position weight numbers corresponding to different letters and letter positions within a word to calculate their hash values. These hash values are arranged sequentially in numerical order and divided into groups according to a predetermined number of higher digits. Numbers of hash values in these groups and the addresses of the first hash values in them are stored. When a letter array is inputted for spell-check, it is codified by the same formula and a corresponding group is identified from its high digits. A sequential comparison is made only with the hash values belonging to this selected group and until the stored hash value in the selected group exceeds the codified number.

7 Claims, 2 Drawing Sheets

ELECTRONIC DICTIONARY AND METHOD OF CODIFYING WORDS THEREFOR

BACKGROUND OF THE INVENTION

This is a continuation-in-part of application Ser. No. 07/463,813 filed Jan. 16, 1990, now abandoned, which is a continuation of Ser. No. 07/289,485 filed Dec. 21, 1988, now abandoned, which is a continuation of application Ser. No. 07/186,721 filed Apr. 22, 1988, now abandoned, which is a continuation of application Ser. No. 06/912,530 filed Sep. 26, 1986, now abandoned.

This invention relates to an electronic dictionary which may be made a part of a word processing apparatus such as a word processor, an electronic typewriter and an optical card reader. More particularly, the invention relates to a method of codifying words for such an electronic dictionary as well as a dictionary with words codified by such a method.

Systems which deal with word data are sometimes provided with an electronic dictionary by means of which the user can check the spelling of the words being entered. Such a spell-check capability is very important to the user and a spell-check routine must be operable quickly in order to be useful.

There have been many methods of codifying and arranging words for an electronic dictionary for such a purpose. The method of simply arranging the words in alphabetical order is not practical. There are, for example, over 7300 words starting with "C" listed in an ordinary dictionary. Such a dictionary would not be useful in connection with a real-time operation, say, on a typewriter.

Words stored in a dictionary may be divided into groups according both to the initial letter and to the total number of letters in the word. Search in such a dictionary may be carried out with one of these groups but this arrangement is not convenient enough because the number of words in each group can still be quite large. Table 1 shows the number of words in each of such groups according to a typical English language dictionary. One learns therefrom, for example, that there are as many as 1154 8-letter words starting with "C". (The bottom line shows the total numbers of words starting with different letters.) In other words, the time required for a search becomes too long and this method cannot be considered useful enough. It is also to be noted regarding those of the groups with a relatively small number of words that a long spell-check time will still be required for spell-checking a word consisting of many letters.

Another disadvantage of the method of this kind is that the memory capacity required for storing a word is not constant, depending on the number of letters in the word. Since the lengths of the words are variable, the time required for their spell-check will not be uniform. When an erroneous input has been made, furthermore, this method requires all words in the corresponding group to be considered before the user can conclude that an error has been committed in the spelling.

TABLE 1

| No. of Letters | A | B | C | D | E | F | G | H | I | J |
|---|---|---|---|---|---|---|---|---|---|---|
| 001 | 0001 | 0001 | 0001 | 0001 | 0001 | 0001 | 0001 | 0001 | 0001 | 0001 |
| 002 | 0022 | 0012 | 0020 | 0012 | 0009 | 0008 | 0008 | 0011 | 0012 | 0006 |
| 003 | 0060 | 0043 | 0051 | 0037 | 0040 | 0048 | 0041 | 0040 | 0037 | 0021 |
| 004 | 0114 | 0185 | 0168 | 0157 | 0070 | 0140 | 0132 | 0136 | 0048 | 0056 |
| 005 | 0263 | 0338 | 0425 | 0272 | 0119 | 0277 | 0245 | 0212 | 0078 | 0080 |
| 006 | 0400 | 0549 | 0719 | 0438 | 0257 | 0401 | 0359 | 0303 | 0167 | 0124 |
| 007 | 0515 | 0661 | 1006 | 0647 | 0383 | 0520 | 0443 | 0415 | 0251 | 0146 |
| 008 | 0583 | 0624 | 1154 | 0724 | 0470 | 0581 | 0377 | 0437 | 0322 | 0106 |
| 009 | 0597 | 0465 | 1092 | 0690 | 0522 | 0438 | 0322 | 0389 | 0430 | 0075 |
| 010 | 0493 | 0331 | 0941 | 0593 | 0442 | 0322 | 0223 | 0307 | 0466 | 0051 |
| 011 | 0355 | 0182 | 0722 | 0456 | 0316 | 0211 | 0121 | 0197 | 0432 | 0022 |
| 012 | 0237 | 0101 | 0483 | 0305 | 0234 | 0094 | 0071 | 0126 | 0328 | 0007 |
| 013 | 0132 | 0052 | 0264 | 0169 | 0108 | 0047 | 0041 | 0058 | 0222 | 0006 |
| 014 | 0054 | 0024 | 0132 | 0088 | 0045 | 0019 | 0016 | 0024 | 0095 | 0001 |
| 015 | 0027 | 0011 | 0057 | 0053 | 0021 | 0003 | 0003 | 0013 | 0071 | 0000 |
| 016 | 0017 | 0004 | 0035 | 0020 | 0013 | 0003 | 0002 | 0005 | 0039 | 0002 |
| 017 | 0007 | 0003 | 0029 | 0009 | 0003 | 0000 | 0000 | 0000 | 0025 | 0000 |
| 018 | 0001 | 0000 | 0006 | 0000 | 0003 | 0000 | 0000 | 0000 | 0005 | 0000 |
| 019 | 0000 | 0000 | 0001 | 0000 | 0001 | 0000 | 0000 | 0000 | 0004 | 0000 |
| 020 | 0000 | 0000 | 0001 | 0000 | 0002 | 0000 | 0000 | 0000 | 0004 | 0000 |
| 021 | 0000 | 0000 | 0000 | 0000 | 0002 | 0000 | 0000 | 0000 | 0000 | 0000 |
| 022 | 0000 | 0000 | 0001 | 0000 | 0000 | 0000 | 0000 | 0000 | 0000 | 0000 |
| 023 | 0000 | 0000 | 0000 | 0000 | 0001 | 0000 | 0000 | 0000 | 0000 | 0000 |
| 024 | 0001 | 0000 | 0000 | 0000 | 0000 | 0000 | 0000 | 0000 | 0000 | 0000 |
| 025 | 0000 | 0000 | 0000 | 0000 | 0000 | 0000 | 0000 | 0000 | 0000 | 0000 |
| 026 | 0000 | 0000 | 0002 | 0000 | 0000 | 0000 | 0000 | 0000 | 0000 | 0000 |
| 027 | 0000 | 0000 | 0000 | 0000 | 0000 | 0000 | 0000 | 0000 | 0000 | 0000 |
| 028 | 0000 | 0000 | 0000 | 0000 | 0000 | 0000 | 0000 | 0000 | 0000 | 0000 |
| 029 | 0000 | 0000 | 0000 | 0000 | 0000 | 0000 | 0000 | 0000 | 0000 | 0000 |
| 030 | 0000 | 0000 | 0000 | 0000 | 0000 | 0000 | 0000 | 0000 | 0000 | 0000 |
| 031 | 0000 | 0000 | 0000 | 0000 | 0001 | 0000 | 0000 | 0000 | 0000 | 0000 |
| 032 | 0000 | 0000 | 0000 | 0000 | 0000 | 0000 | 0000 | 0000 | 0000 | 0000 |
| 033 | 0000 | 0000 | 0000 | 0000 | 0000 | 0000 | 0000 | 0000 | 0000 | 0000 |
| 034 | 0000 | 0000 | 0000 | 0000 | 0000 | 0000 | 0000 | 0000 | 0000 | 0000 |
| 035 | 0000 | 0000 | 0000 | 0000 | 0000 | 0000 | 0000 | 0000 | 0000 | 0000 |
| 036 | 0000 | 0000 | 0000 | 0000 | 0000 | 0000 | 0000 | 0000 | 0000 | 0000 |
| 037 | 0000 | 0000 | 0000 | 0000 | 0000 | 0000 | 0000 | 0000 | 0000 | 0000 |
| 038 | 0000 | 0000 | 0000 | 0000 | 0000 | 0000 | 0000 | 0000 | 0000 | 0000 |
| TOTAL | 3879 | 3596 | 7309 | 4671 | 3064 | 3113 | 2405 | 2674 | 3036 | 0703 |

SUMMARY OF THE INVENTION

It is therefore an object of the present invention in view of the above to provide an electronic dictionary which can be searched efficiently, say, for a spell-check purpose.

It is another object of the present invention to provide a method of codifying words for storing them in an electronic dictionary.

It is still another object of the present invention to provide an apparatus by which words can be codified in an efficient manner for storage in an electronic dictionary.

The above and other objects of the present invention can be achieved by codifying words by (a) preliminarily defining letter weight numbers individually corresponding to letters and position weight numbers individually corresponding to letter positions in a word, (b) considering even-letter words and odd-letter words separately, (c) multiplying the letter and position weight numbers of each letter of a given word in a specified manner and dividing by a predefined divisor to obtain a multi-digit hash value, (d) splitting this multi-digit hash value into an index section and a data section, and (e) dividing these hash values into groups according to the index sections and arranging their data sections in ascending order within each group.

BRIEF DESCRIPTION OF THE DRAWINGS

The accompanying drawings, which are incorporated in and form a part of the specification, illustrate an embodiment of the present invention and serve to explain the principles of the invention. In the drawings.

DETAILED DESCRIPTION OF THE INVENTION

Figure 1:
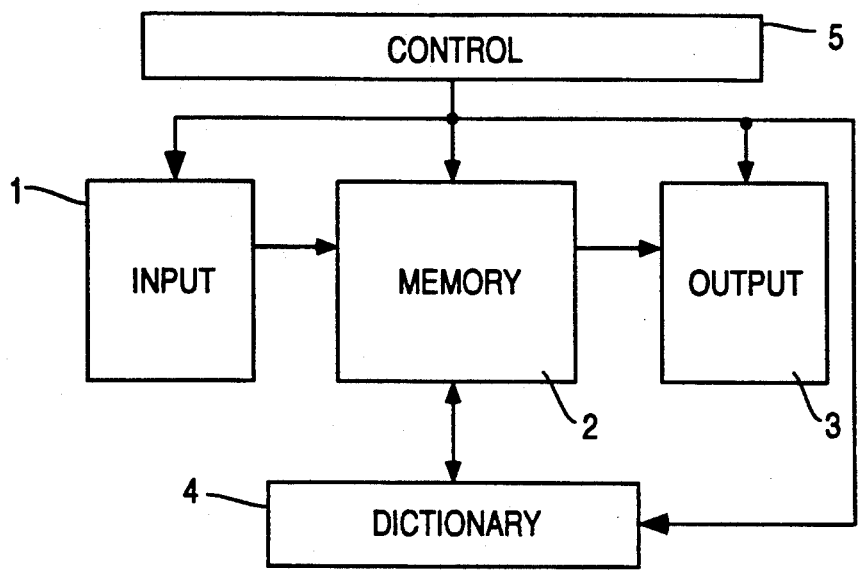
FIG. 1 is a block diagram of a word processing system for incorporating the present invention.

The general construction of a word processing system to which an electronic dictionary of the present invention can be incorporated is broadly illustrated in FIG. 1 wherein numeral 1 indicates an input device for entering characters and word data into this system. This input device may include a keyboard of a known type, a tablet-like device, an optical card reader (OCR), or a magnetic tape device. Numeral 2 indicates a memory device connected to the input device 1. A core memory, an IC memory, a magnetic disk and the like may be used for this purpose. It is further connected to an output device 3 to be used for the output of data stored in the memory device 2. A printer, a display unit, a magnetic tape unit and a magnetic disk of all types can be used as the output device. The memory device 2 is also connected to an electronic dictionary 4 for checking the spelling of specified words comprising, for example, a core memory, an IC memory, a random-access memory (RAM), or a magnetic disk. As will be described below, this dictionary is provided with as processing means which exclusively serves to check the spelling of a given word, that is, the electronic dictionary 4 is adapted to determine in response to a request from the memory device 2 whether a given word is spelled correctly or not. Each of the aforementioned devices 1–4 is connected to a control unit 5 which may include a computer and serves to control the transmission of signals among the devices described above.

Regarding a system as described generally above, the present invention teaches a method of codifying words such that they can be stored efficiently in a memory (that is, requiring only a small memory) and retrieved quickly from such a memory. In what follows, a method of codifying English words will be described first, followed by a method of storing such codified words and a spell-check method. These methods, which are to be described below, are in accordance with a preferred embodiment of the invention and intended to be illustrative, not to thereby limit the scope of the invention.

Firstly, all English words to be registered are replaced by, or codified into 27-bit numerals. For this purpose, each letter of the alphabet is assigned a different binary "letter weight number". Since there are 26 capital letters and 26 lower case numbers, the letter weight numbers are binary numbers with 6 digits, or 6-bit numbers. Numerals (0–9) and certain symbols (such as the apostrophe) may be assigned distinctive letter weight numbess. Similarly, binary position weight numbers are assigned to different letter positions in a word. On the assumption that there is no word to be registered which contains 30 or more letters, only 29 of these position weight numbers are defined. On the further assumption that about a total of 100,000 words is going to be codified, position weight numbers are selected as binary numbers with 64 digits.

With the letter and position weight numbers defined as above, each word to be registered is codified by multiplying the letter weight number of each letter of the word by the corresponding position weight number, adding these products for all letters of the word and obtaining a hash value. This is done according to a routine to be explained next by way of an example and the flow chart shown in FIG. 2.

Consider an exemplary (fictitious) three-letter word "XYZ" as an example. After a working memory space is initialized (set equal to 0) (n1), the first letter in the given word ("X" in this example) is considered (n2) and the 6-bit letter weight number corresponding to this letter is retrieved (n3). Let this letter weight number be L, which is a 6-digit binary number. In the next step (n4), this 6-digit number is divided into two 3-digit numbers L1 and L2, L1 being the first 3-digits of L and L2 being the last 3-digits of L. In other words, if L=110010, L1 and L2 will respectively be L1=110 and L2=010 in binary. Next, since "X" is the first letter of the given word, the position weight number corresponding to the first position is retrieved (n5). Let this position weight number be P, which is a 64-digit binary number. In the next step (n6), this retrieved number P is similarly divided into two 32-digit numbers P1 and P2, respectively representing the first 32 digits and the last 32 digits of P. After these four numbers L1, L2, P1 and P2 are thus prepared, the value of (L1P1+L2P2) is calculated and then divided by the prime number closest to ($2^{27}-1$) to obtain a remainder (n7). This remainder would serve as the hash value for a single-letter word "X" and is temporarily stored at the aforementioned initialized work space (n8).

Figure 2:
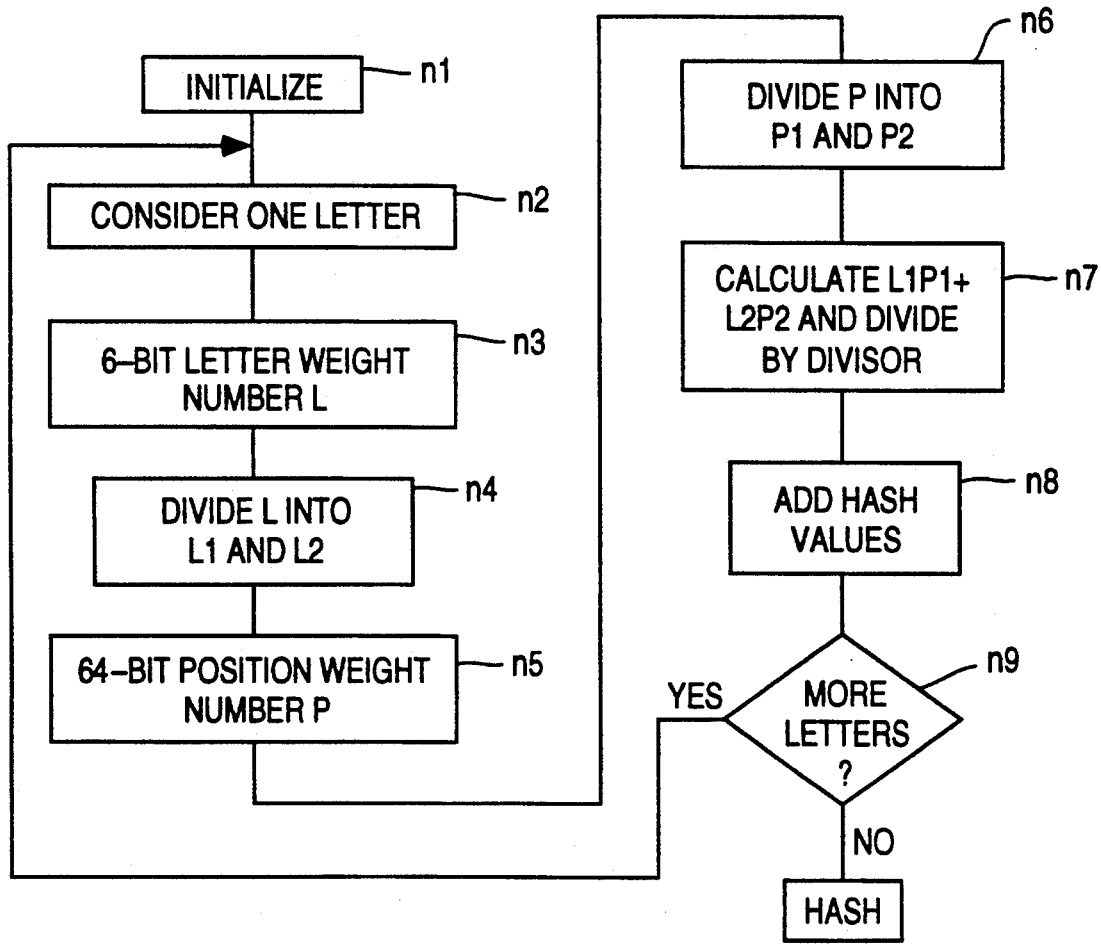
FIG. 2 is a flow chart of a process according to the present invention for codifying words.

Since "X38 , in this example, is not the final letter of the word under consideration (YES in n9), the next letter "Y" is considered in the next cycle with reference to the flow chart of FIG. 2. By proceeding similarly from Step n3 to Step n7, another remainder is obtained and this newly obtained remainder is added to the temporarily saved remainder obtained (n8). This sum of the remainders, which would serve as the hash value for a two-letter word "XY", is stored (temporarily) in the place of the previously (temporarily) stored remainder value.

The same cycle of steps is repeated for the last letter "Z" and the final remainder (the sum of three remainder values obtained for the three individual letters) is defined as the hash value of the given word. Since the prime number closest to $(2^{27}-1)$ is used as the divisor throughout this routine according to this example, all hash values can be expressed as a binary number with 27 digits or less. If the divisor is changed to another prime number which is closest to a different power of 2, the number of digits of the hash values can be varied.

Table 2 shows the exemplary hash values of words (written in octal) appearing at the beginning when arranged in alphabetical order corresponding to a certain particular choice of letter and position weight numbers.

According to the present invention, these hash numbers are rearranged next in the ascending numerical order. Table 3 shows (for a certain exemplary dictionary) the lowest hash values (in octal) together with the corresponding words. According to a preferred embodiment of the present invention, all words to be registered are divided into those with an even number of letters ("even-letter words") and those with an odd number of letters ("odd-letter words") and the hash values corresponding to even-letter and odd-letter words are separately registered in a dictionary.

TABLE 2

| Hash Value | Word |
|---|---|
| 627062512 | aardvark |
| 013662677 | aardvarks |
| 720357163 | Aaron |
| 411613330 | abaci |
| 201213330 | aback |
| 052615503 | abocus |
| 074557027 | abacuses |
| 614351261 | avaft |
| 305351462 | avalone |
| 261617146 | abandon |
| 005731615 | abandoned |
| 424072002 | abandoner |
| 503503327 | abandoning |
| 44542206 | abandonment |
| 303465146 | abandons |
| 421153261 | abase |
| 041154020 | abased |
| 475171636 | abasement |
| 621155434 | abases |
| 432753261 | abash |
| 573025663 | abashed |
| 573172665 | abashes |
| 117675467 | abashing |
| 506771636 | abashment |
| 374422475 | abasing |
| 421035261 | abate |
| 041036020 | abated |
| 475053636 | abatement |
| 155066547 | abatements |
| 621037434 | abates |
| 374304475 | abating |
| 614037503 | abatis |
| 636001027 | abatises |
| 561745260 | abattoir |
| 746545376 | abattoirs |
| 05727051 | abbacies |
| 435331130 | abbacy |
| 255457701 | abbe |
| 627457701 | abbes |
| 027462123 | abbess |
| 051423447 | abbesses |
| 466057701 | abbey |

TABLE 2-continued

| Hash Value | Word |
|---|---|
| 666062054 | abbeys |
| 614733701 | abbot |
| 014736123 | abbots |

According to prior art routines, 8 bits (1 byte) are usually required to express a letter and hence 32 bits will be required to express a 4-letter word. Since Table 1 shows that the average number of the words to be registered is 5-6, the method of replacing each word by a 27-bit number would not be considered very effective. The present invention, therefore, incorporates an indexing method as follows.

After each word to be registered has been converted into a 27-digit binary number and these hash values are rearranged in the ascending order (separately for even-letter and odd-letter words), each hash value is divided into the index portion (hereinafter simply referred to as the "index") consisting of the upper 11 digits when the hash value is expressed in binary and the data portion (hereinafter simply referred to as the "data") consisting of the remaining lower 16 digits. Words are then grouped together according to their index, that is, those words having the same index are grouped together. With reference to Table 3 (for both even-letter and odd-letter words), the 43 words from "nevus" to "accommodator", of which the hash values are less than $2^{16}$ (or 200000 in octal), all have the index "0" and they may be referred to as the zeroth group. Similarly, those words with hash values equal to o greater than $2^{16}$ and less than $2^{17}$, having the index "1", may be referred to as the first group, and so forth. In this manner, $2^{11}=2048$ such groups (from the zeroth to the 2047th) are created separately for even-letter and odd-letter words. It now goes without saying in this connection that the number of groups can be increased or decreased if a different number of digits is given to the index portion.

After 2048 groups of hash values are thus created (separately for even-letter and odd-letter words), the number of words belonging to each group is counted and stored. According to a particular embodiment of the present invention with a particular choice of letter and position weight numbers for codifying a typical dictionary containing about 74,000 words, the numbers of even-letter words in Groups 000, 001, 002, 003, ... were 21, 14, 16, 13, ..., respectively, in decimal. These numbers, as well as those for odd-letter words, are stored. The largest number of even-letter words in a group was 67. In other words, the spelling of any (even-letter) word can be checked by no more than 67 times of search. The 16-bit data portions of the hash values are sequentially stored in the dictionary from the zeroth address.

TABLE 3

| Hash Value | Word |
|---|---|
| 000000745 | nevus |
| 000004213 | entrenches |
| 000005075 | Eurodollar |
| 000011631 | billhooks |
| 000015105 | nexus |
| 000016265 | negus |
| 000017145 | breakfronts |
| 000017320 | pieta |
| 000020272 | correspondents |
| 000021333 | sentinels |
| 000033540 | starboard |
| 000037417 | interchanges |

TABLE 3-continued

| Hash Value | Word |
| --- | --- |
| 000037552 | pasta |
| 000040713 | indolent |
| 000042775 | simian |
| 000044535 | adsorbate |
| 000045371 | recedes |
| 000052231 | fabricated |
| 000057151 | mansards |
| 000060010 | dredge |
| 000065030 | ciliate |
| 000065473 | insolent |
| 000070742 | varnish |
| 000076105 | dentists |
| 000103410 | drudge |
| 000106374 | ilex |
| 000112020 | overcapitalize |
| 000113447 | lifestyle |
| 000114605 | tangiest |
| 000121715 | desiccated |
| 000131466 | dredged |
| 000136045 | pageants |
| 000136653 | silliest |
| 000142357 | repairers |
| 000152333 | sorghum |
| 000155066 | drudged |
| 000157430 | queenliest |
| 000157607 | medically |
| 000163073 | cattily |
| 000166277 | wayfarer |
| 000172567 | sprains |
| 000172636 | strains |
| 000173734 | accommodator |
| 000202554 | surliest |
| 000204623 | musically |

The address in the dictionary at which the first data portion of each group (for both even-letter and odd-letter words) is calculated next. For the purpose of description, let us now consider only the part corresponding to even-letter words. For the zeroth group, the first data portion is stored at Address 0. The address of the first data portion of the first group is equal to the number of hash numbers (or words) in the zeroth group. (The real address in bytes is twice this number because each 16-bit data portion requires 2 bytes to store. For the convenience of explanation, this factor of 2 will be ignored in the description which follows.) In the case of the example discussed above, there are 21 even-letter words (or data portions thereof) in Group 000. Thus, the address of the first word in Group 000 is 0 and that of the first word in Group 001 is 21. Similarly, since the numbers of (even-letter) words in Groups 001 and 002 are 14 and 16, respectively, the addresses of the first words in Groups 002 and 003 are $21+14 = 35$ and $35+16 = 51$, respectively. In other words, the addresses of the first words of the groups can be readily calculated by sequentially adding the numbers of words in the groups in the ascending order and the addresses thus calculated for the first words in the groups corresponding to both even-letter and odd-letter words are also stored in a memory device for reference, as will be explained below. For the purpose of reference, the address of the first data portion of the $n^{th}$ group ($n=0 - 2047$) will be denoted by $A_n$.

Next, a method of using this dictionary for a spell-check operation (or for retrieving a word) is described. First, it is determined whether the word to be retrieved is an even-letter word or an odd-letter word and the corresponding dictionary is selected. Next, the word to be retrieved is converted into a 27-bit number in the same way described above and this 27-bit number is divided into the 11-bit index portion representing the higher 11 digits and the 16-bit (2-byte) data portion.

From this index portion, it is immediately ascertained which group (for even-letter or odd-letter words) this word belongs to and, if this word belongs to the $m^{th}$ group, it can be ascertained that there are $(A_{m+1} - A_m) = N_m$ words in this group. In other words, the number of data to be checked is at most $N_m$. Since the $N_m$ data in this group (from $A_m$ to $A_{m+1} - 1$) are arranged in the ascending order, however, it is not necessary to check all of these data. The comparison starts from the first word in the group and as soon as the data value exceeds the 16-bit data portion of the hash value for the word to be retrieved, it can be concluded that the retrieval failed, or that the input word is not in the dictionary. In summary, even after the group to be checked has been determined, it is not always necessary to make a comparison with every one of the words in that group and hence the time required for retrieval (spell-check) is substantially reduced.

Figure 3:
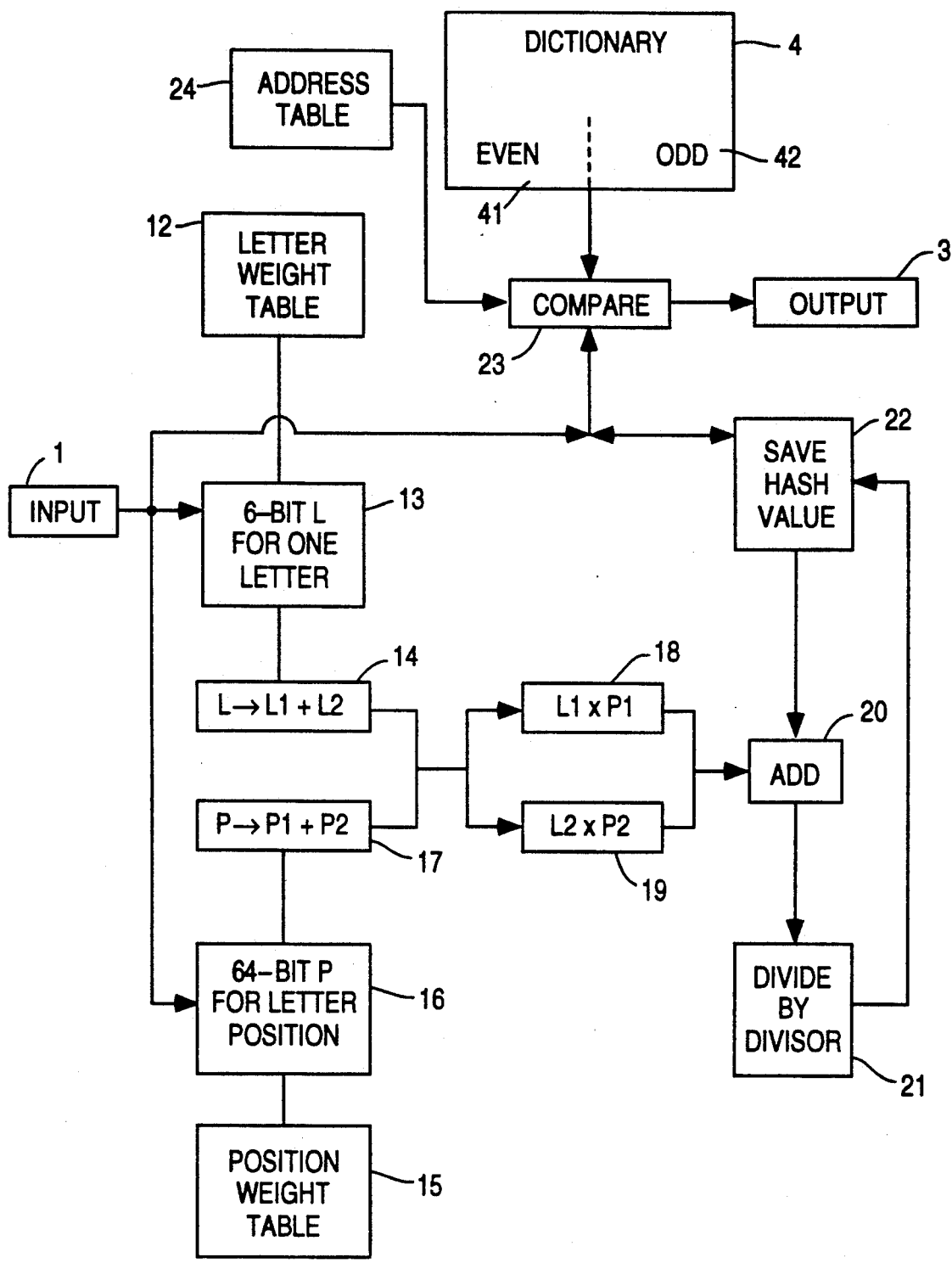
FIG. 3 is a block diagram of a control unit of the system of FIG. 1 for controlling the spell-check operation.

An example of a circuit structure for the control unit 5 (of FIG. 1) with which words can be codified and a given word (or a letter array) can be retrieved for the purpose of spell-check as described above is illustrated in FIG. 3, and its function will be explained below with reference to the flow chart of FIG. 2.

A word to be retrieved (represented symbolically, for example, as XYZ as in the previous example) is entered as a letter array through the input device 1, ending with a punctuation signal indicating the end of the letter array. Evenness or oddness of the inputted word is immediately determined thereupon. When the first letter (X in this example) is taken in (n2 in FIG. 2), a letter weight table 12 is referenced and a 6-bit letter weight number L corresponding to the inputted first letter is retrieved (at 13) and the first three digits L1 and the second three digits L2 are separately stored (at 14). Since this is a first letter in the inputted word, a 64-bit position weight number P for the first position is retrieved from a position weight table 16 (to 16). As done with the letter weight number L, the retrieved position weight number P is also divided into the first 32 digits P1 and the second 32 digits P2 and they are separately stored (at 17). Products $L1 \times P1$ and $L2 \times P2$ are calculated (at 18 and 19) and the sum of these two products are obtained (at 20). The sum thus obtained is divided by the prime number closest to $(2^{27} - 1)$ to obtain a remainder (at 21) and the hash value thus obtained is stored (at 22).

This is repeated for the second and subsequent letters, each time adding the residue obtained at 21 to the previous hash value stored at 22. When all letters of the inputted word is thus processed, the value then stored at 22 is the hash value of the inputted word.

The dictionary 4 is divided into an even-letter portion 41 and an odd-letter portion 42. For the purpose of spell-check, evenness or oddness of the inputted word, for which the hash value is now stored at 22, is checked. In the present example, XYZ is an odd-letter word and spell-check is carried out with the odd-letter portion 42 of the dictionary 4. For the comparison (at 23), the index portion of the hash value at 22 is checked to thereby determine which of the 2048 groups in the odd-letter portion 42 should be referenced. When the group is ascertained, an address table 24 listing the address of the first word in each group (of odd-letter words) is consulted to determine from what address of the dictionary 4 (or the odd-letter portion thereof) a search (or comparison) should be carried out. As mentioned above, since words within the same group are arranged in ascending order of their hash values (or the data portions thereof) in the dictionary 4, the search within the identified group need not be carried out by comparing the hash value at 22 with every stored hash value in the group. The search may be stopped when the data portion of the hash value stored at 22 exceeds that of a word in the group. In this manner, the time required for a search can be significantly reduced. The result of the search is outputted through an output device 3.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the present invention has been described above by way of a spell-check routine. The method of and apparatus for codifying words according to the present invention in connection with an electronic dictionary can be also used for adding a new word to the dictionary or deleting a selected word from the dictionary. The dictionary 4 may further include both a main dictionary provided by the system itself and a user dictionary serving to store only words selected by the user. The user dictionary may similarly have an index section, a first data section for storing user-selected words as numerical data by the aforementioned hash method, and a second data section with areas for storing these words as character data. When the user wishes to check the spelling of a word, its hash value is calculated in the same manner as described above and a high speed search is carried out from the index section. The second data section may be used principally for deleting a word from the user dictionary.

In summary, electronic dictionaries of the present invention can be processed efficiently and speedily because words to be stored are grouped together in such a way that the number of groups and hence the numbers of words in individual groups can be adjusted by increasing or decreasing the number of digits in the index portion of the aforementioned hash values. If the aforementioned number of digits of the index is made sufficiently large such that the number of groups is greater than if the words are grouped by the initial letter or the number of letters in the word, as previously attempted, the number of words in each group can be reduced and hence the time required for the search can also be reduced.

Moreover, codification is effected by the present invention in units of words rather than in units of letters as done previously such that the memory space for each word can be made not only uniform but also small. In other words, the total memory capacity required of the whole dictionary can also be reduced. In addition, since the data belonging to each group are arranged in ascending order, the data of a test word need not be compared with all data in the selected group. Since a conclusion of an error can be reached before comparison is made with all data in the group, the processing time can be further reduced.

Still another advantage according to the present invention is achieved by dividing words into even-letter and odd-letter words. This method of grouping words, for example, by means of alternately emitted ON and OFF signals from the input device 1, is advantageous because evenness and oddness of a word can be more easily ascertained in this manner than by an ordinary method of determining a group from the content of the data.

In summary, such modifications and variations that may be apparent to a person skilled in the art are intended to be included within the scope of this invention.

What is claimed is:

1. A method of using an electronic dictionary, said method comprising the steps of
   (a) preliminarily defining letter weight numbers individually corresponding to alphanumeric symbols and position weight numbers individually corresponding to letter positions in any word,
   (b) obtaining a word-representing hash value for each of given words to be stored by sequentially calculating letter-representing hash values of individual letters of said each given word from both the letter and position weight numbers respectively corresponding to said individual letters and a predefined divisor and by adding said sequentially calculated letter-representing hash values,
   (c) arranging said obtained word-representing hash values sequentially in numerical order separately for even-letter words and odd-letter words,
   (d) dividing each of said word-representing hash values into an index section represented by high digits thereof and a data section represented by lower digits thereof,
   (e) forming groups of said word-representing hash values according to said index sections separately for even-letter words and odd-letter words,
   (f) storing numbers of said word-representing hash values in said groups,
   (g) calculating and storing addresses of the first word-representing hash values in said groups.

2. The method of claim 1 wherein said word-representing hash values are $N_w$-digit numbers where $N_w$ is a plural number and said divisor is a prime number closest to $2^{**}N_w - 1$.

3. The method of claim 1 wherein
   said letter weight numbers and position weight numbers are respectively $N_L$-digit and $N_P$-digit numbers where $N_L$ and $N_P$ are plural numbers, and
   said letter-representing hash values are calculated by multiplying the first and the second $N_L/2$ digits of said letter weight number respectively by the first and the second $N_P/2$ digits of said position weight number, adding the two products together and dividing the sum by said divisor.

4. The method of claim 2 wherein said index section has $N_I$ digits and $N_w - N_I = 16$.

5. The method of claim 1 further comprising the steps of
   (h) inputting a letter array for spell check,
   (i) obtaining an array-representing hash value corresponding to said letter array as said word-representing hash values are obtained corresponding to said given words as in said Step (b),
   (j) selecting a candidate group out of said groups according to higher digits of said array-representing hash value,
   (k) retrieving the number of said word-representing hash values and the address of the first of said word-representing hash values in said candidate group, and
   (l) sequentially comparing said array-representing hash value with those of said word-representing hash values of said candidate group.

6. The method of claim 5 wherein said Step (1) is stopped when said array-representing hash value becomes greater than the one of said word-representing hash numbers being compared therewith.

7. A word processing system comprising an electronic dictionary which stores word-representing hash values each corresponding to a word, said electronic dictionary having an even-letter part storing those of said word-representing hash values representing even-letter words and an odd-letter part storing those of said word-representing hash values representing odd-letter words, said word-representing hash values being arranged in numerical order and divided into groups in each of said even-letter and odd-letter parts, first addresses of said word-representing hash values in said groups being stored, input means for receiving a letter array and determining the number of letters in said letter array, a letter weight table storing preliminarily defined letter weight numbers individually corresponding to alphanumeric symbols, a position weight table storing preliminarily defined position weight numbers individually corresponding to letter positions in any word, retrieving means for sequentially retrieving from said letter and position weight tables one each of said letter and position weight numbers corresponding to each of the letters of said letter array, calculating means for calculating letter-representing hash values for the letters of said letter array from said letter and position weight numbers retrieved by said retrieving means and by a division by a predefined divisor, hash-value calculating means for calculating an array-representing hash value corresponding to said letter array by adding said letter-representing hash values obtained by said calculating means, and control means for selecting one of said groups stored in said electronic dictionary from high digits of said array-representing hash value and determining whether said array-representing hash value coincides with any of said word-presenting hash values in said selected one of said groups in said electronic dictionary.

* * * * *